United States Patent [19]

Yoshimatsu et al.

[11] Patent Number: 4,843,486
[45] Date of Patent: Jun. 27, 1989

[54] MULTI-ELEMENT MAGNETIC HEAD AND METHOD OF FABRICATING THE SAME

[75] Inventors: Toshikane Yoshimatsu, Odawara; Yoshiki Hagiwara, Hadano; Yoshikazu Tsuji, Kanagawa; Kazuhiro Momata, Chigasaki, all of Japan

[73] Assignee: Hitachi, Ltd., Tokyo, Japan

[21] Appl. No.: 33,733

[22] Filed: Apr. 3, 1987

[30] Foreign Application Priority Data

Apr. 3, 1986 [JP] Japan ................... 61-77490

[51] Int. Cl.⁴ .................... G11B 5/265; G11B 5/29
[52] U.S. Cl. ..................................... 360/121; 29/603
[58] Field of Search ............... 360/121, 119–120, 360/122, 123, 125; 29/603

[56] References Cited

U.S. PATENT DOCUMENTS

| | | | |
|---|---|---|---|
| 3,354,540 | 11/1967 | Duinker | 360/119 |
| 3,601,871 | 8/1971 | Pierce | 360/119 |
| 4,396,967 | 8/1983 | Argumedo et al. | 360/121 |
| 4,704,788 | 11/1987 | Eckstein | 360/119 |

FOREIGN PATENT DOCUMENTS 0099914 5/1986 Japan ....................... 29/603

*Primary Examiner*—John H. Wolff
*Assistant Examiner*—David J. Severin
*Attorney, Agent, or Firm*—Antonelli, Terry & Wands

[57] ABSTRACT

A method of fabricating a multi-element magnetic head core is provided in which a plurality of first grooves are formed in a surface of a magnetic block to form a plurality of magnetic circuits, a plurality of second grooves are formed in this surface in directions perpendicular to the first grooves to separate the magnetic circuits from each other, the first and second grooves are filled with a non-magnetic material, the magnetic block is then cut along lines parallel to the second grooves to obtain a plurality of core blocks, and a third groove is formed in each core block from a side wall thereof to isolate the magnetic circuits completely from each other. According to this method, the number of fabrication steps required for forming a multi-element magnetic head core can be reduced, and moreover a multiplicity of magnetic head cores can be formed at the same time.

7 Claims, 4 Drawing Sheets

MULTI-ELEMENT MAGNETIC HEAD AND METHOD OF FABRICATING THE SAME

BACKGROUND OF THE INVENTION

The present invention relates to a method of fabricating a magnetic head, and more particularly to a method of fabricating a multi-element magnetic head which is suited to record data on a plurality of tracks of a magnetic recording medium at the same time.

A method of fabricating a multi-element magnetic head has hitherto been used, in which ceramic blocks are bonded to both sides of a thin ferrite block, the ferrite block is cut so as to form a laminate of a ferrite layer and the ceramic block, the cutting plane is ground and polished so that the ferrite layer has a predetermined thickness, slots for defining tracks are formed in the ferrite layer at a central portion thereof and are then filled with glass, the ferrite layer is subjected to patterning so as to have a desired shape, and the laminate is cut into parts, to form a plurality of multi-element magnetic heads each having a plurality of magnetic circuits which correspond to a plurality of tracks and are independent of each other. The above method is disclosed in, for example, JP-A-No. 57-169,917 i.e. U.S. Pat. No. 4,396,967. In this method, however, a large number of working steps are required, and thus, it takes a lot of time to fabricate the multi-element magnetic head. Further, only a few magnetic heads can be formed at the same time.

SUMMARY OF THE INVENTION

It is therefore an object of the present invention to provide a method of fabricating a magnetic head, in which method the number of working steps is reduced, and a multiplicity of magnetic heads can be formed at the same time.

In order to attain the above object, according to the present invention, there is provided a method of fabricating a multi-element magnetic head core in such a manner that a magnetic block such as a ferrite block is separated by a non-magnetic material such as glass into parts to form a plurality of magnetic circuits independent of each other, which method comprises the steps of: forming a plurality of track-defining grooves in a surface of a block made of a magnetic material, to form a plurality of tracks each having a predetermined width; forming a plurality of track-separating grooves in the surface of the block in directions inclined at an angle with the track-defining grooves, to separate the tracks from each other; filling the track-defining grooves and the track-separating grooves with a non-magnetic material such as glass; cutting the block along lines substantially parallel to the track-separating grooves into a plurality of sub-blocks having the same form; and forming a groove in each sub-block so that the tracks are isolated completely from each other by the non-magnetic material and thus a magnetic field formed in each track is confined thereto, to use each sub-block as a magnetic core of magnetic head. In the above method, the track-separating groove are formed so as to obtain a desired number of sub-blocks. That is, a large number of sub-blocks determined by the capacity of a processing machine can be formed at the same time. Further, the track-defining grooves and the track-separating grooves are simultaneously filled with glass, and thus, the track separation and the ferrite-core separation are made at the same time. That is, the present invention does not require a step included in the conventional method for bonding a ferrite block to a ceramic block to use the bonding layer for ferrite-core separation, and thus can reduce the number of fabrication steps. Further, according to the present invention, a large number of magnetic cores corresponding to the above sub-blocks can be formed at the same time. Accordingly, the number of steps required for fabricating a multi-element magnetic head is reduced.

DESCRIPTION OF THE PREFERRED EMBODIMENTS

Now, explanation will be made of embodiments of the present invention, with reference to the drawings.

Figure 1:
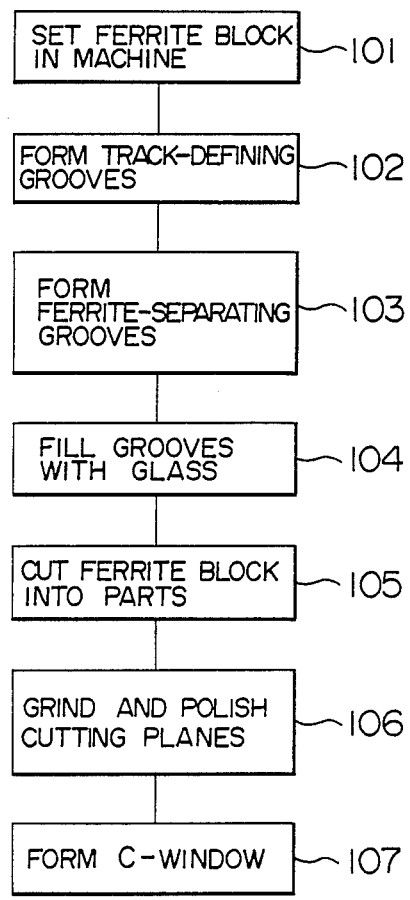
FIG. 1 is a flow chart showing several fabrication steps included in a first embodiment of a method of fabricating a multi-element magnetic head in accordance with the present invention.

FIG. 1 is a flow chart showing several fabrication steps included in a first embodiment of a method of fabricating a multi-element magnetic head in accordance with the present invention, and FIGS. 2A to 2G are perspective views for explaining machining operations which are performed for a workpiece in the fabrication steps of FIG. 1. First, the fabrication procedure of a first magnetic head core shown in FIG. 2G will be explained in accordance with the flow chart of FIG. 1.

Figure 2A:
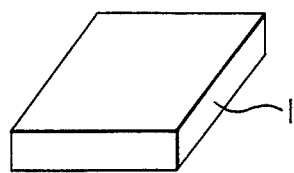
FIGS. 2A to 2G are perspective views for explaining machining operations which are performed for a workpiece in the fabrication steps of FIG. 1.
Figure 2B:
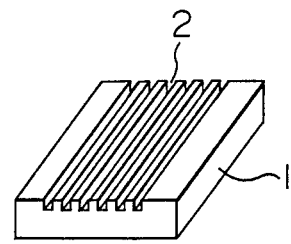
Figure 2C:
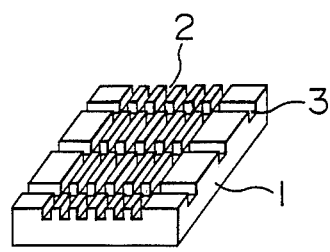
Figure 2D:
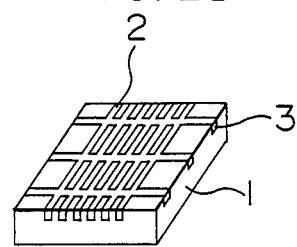
Figure 2E:
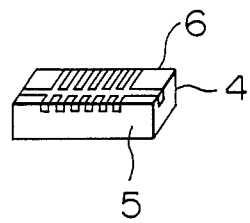
Figure 2F:
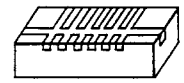
Figure 2G:
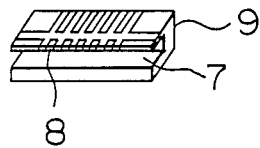

In order to fabricate the first magnetic head core, a ferrite block 1 shown in FIG. 2A is set in a predetermined portion of a processing machine (step 101). Then, as shown in FIG. 2B, a plurality of track-defining grooves 2 are formed in a surface of the block 1 so as to form parallel tracks each having a predetermined width (step 102). For example, each of the track-defining grooves 2 has a width of about 100 μm and a depth of about 1 mm. Next, as shown in FIG. 2C, a plurality of ferrite-separating grooves 3 are formed in the surface of the block 1 in directions perpendicular to the track-defining grooves 2 (step 103). The ferrite-separating grooves 3 are formed in accordance with a desired number of first magnetic head cores, and a plurality of ferrite cores corresponding to the tracks are isolated from each other by the ferrite-separating grooves filled with glass, as will be explained later. For example, in a case where the ferrite block 1 is divided into ten parts each forming the first magnetic head core, ten ferrite-separating grooves 3 are formed in the surface of the ferrite block 1. The ferrite-separating groove 3 may be made equal in width and depth to the ferrite-defining groove 2. Thereafter, glass rods or plates are placed in the ferrite-separating grooves 3 and are then fused to fill the track-defining grooves 2 and the ferrite-separating grooves 3 with glass, as shown in FIG. 2D (step 104). Next, the ferrite block 1 is cut along lines parallel to the ferrite-separating grooves 3 into parts to obtain a plurality of structures 4, one of which is shown in FIG. 2E (step 105). Thereafter, as shown in FIG. 2F, cutting planes 5 and 6 of the structure 4 are ground and polished so that the structure 4 has predetermined length in a direction parallel to the track-defining grooves (step 106). Next, as shown in FIG. 2G, a ferrite-core separating groove (that is, a C-shaped window) 7 is formed in the structure 4 to obtain a structure 9 having a plurality of ferrite-cores 8 which are isolated completely from each other by the glass (step 107).

Figure 3:
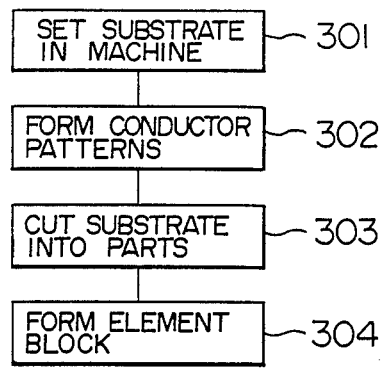
FIG. 3 is a flow chart showing fabrication steps included in a method of fabricating a thin-film element block which is used in the first embodiment.

FIG. 3 is a flow chart showing fabrication steps included in a method of fabricating a thin film element block which is used in the first embodiment, and FIGS. 4A to 4E are perspective views for explaining various operations which are performed for a ferrite substrate in the fabrication steps of FIG. 3. Now, the fabrication process of a thin film element block 10 (that is, a second magnetic head core) shown in FIG. 4E will be explained below in accordance with the flow chart of FIG. 3.

Figure 4A:
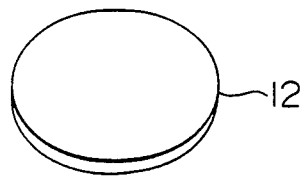
FIGS. 4A to 4E are perspective views for explaining various operations which are performed for a ferrite substrate in the fabrication steps of FIG. 3.
Figure 4B:
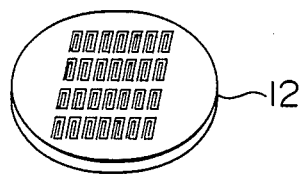
Figure 4C:
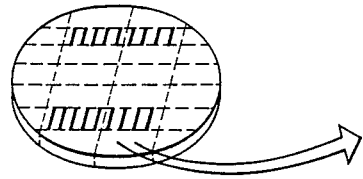
Figure 4D:
Figure 4E:

First, a substrate 12 which is shown in FIG. 4A and made of ferrite or other magnetic materials, is set in the predetermined portion of the processing machine (step 301). Referring to FIG. 4B, an $Al_2O_3$ film is formed on the substrate 12 by sputtering, grooves for forming conductor patterns are made in the $Al_2O_3$ film through etching techniques and conductor patterns made of such as gold are formed in the grooves by sputtering (step 302). Thereafter, as shown in FIGS. 4C and 4D, the substrate 12 is cut into blocks so that each block includes a plurality of element blocks (step 303). Then, as shown in FIG. 4E, a thin-film element block 10 is formed (step 304).

Figure 5:
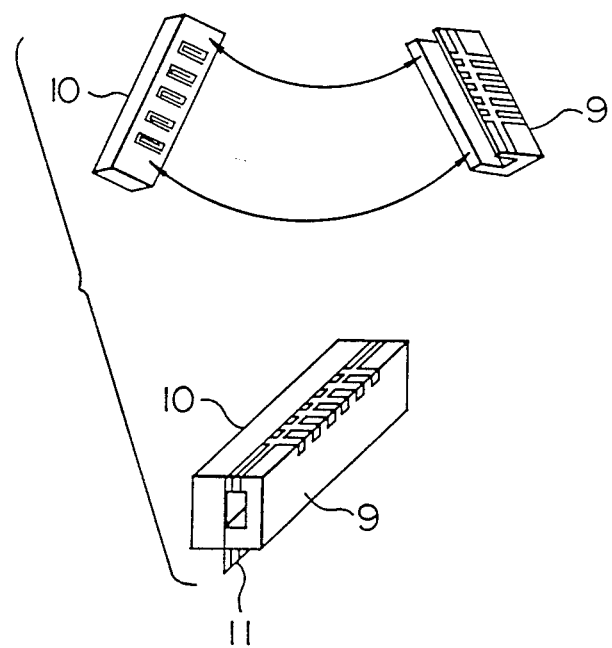
FIG. 5 is a perspective view showing a multi-element magnetic head which is fabricated by the first embodiment.

The structure 9 which is formed by the fabrication steps of FIG. 1, is bonded through, for example, adhesives to the thin film element block 10 which has the conductor patterns on the substrate 12, to form a thin-film magnetic head. An example of the thin-film magnetic head thus obtained is shown in FIG. 5. In FIG. 5, a reference numeral 11 designates lead wires of the conductor patterns (that is, winding patterns), and holes (not shown) are bored through the bottom wall of the structure 9 so that the lead wires pass through the holes and are then connected to a flexible printed circuit board.

Figure 6:
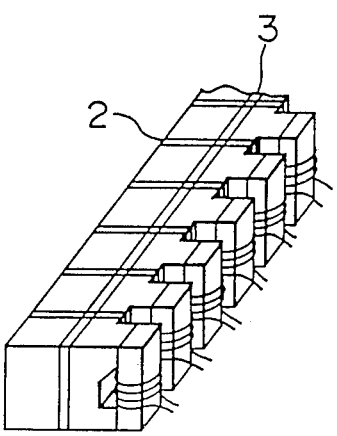
FIG. 6 is a perspective view showing another multi-element magnetic head which is obtained by a second embodiment of the fabrication method according to the present invention.

FIG. 6 is a perspective view showing a multi-element magnetic head which is obtained by a second embodiment of the fabrication method according to the present invention. The multi-element magnetic head shown in FIG. 6 is an ordinary magnetic head having a plurality of tracks. In the first embodiment which has been explained with reference to FIGS. 1 to 5, a thin-film multi-element magnetic head is formed. However, the present invention is not limited to such a thin-film magnetic head, but is applicable to an ordinary magnetic head. That is, when a first magnetic head core made of ferrite or the like and having the grooves 2 and 3 is bonded to a plurality of core blocks each made of ferrite or the like and having a winding structure, so as to form a gap between the first magnetic head core and each core block, a multi-element magnetic head is formed as shown in FIG. 1.

As can be seen from the above description, according to the first and second embodiments, a first magnetic head core having a plurality of tracks which are separated from each other by glass, can be formed only by seven fabrication steps, that is, the formation of track-defining grooves, the formation of ferrite-separating grooves, the filling of the grooves with glass, the cutting of a block into parts, the grinding of cutting planes, the polishing of cutting planes, and the formation of a C-shaped window. Moreover, a multiplicity of first magnetic head cores can be formed at the same time. Further, according to these embodiments, the track-defining grooves and the ferrite-separating grooves are simultaneously filled with glass, and thus the track separation and the ferrite-core separation are made at the same time. While, in the conventional fabrication method, a ferrite block and a ceramic block are bonded to each other, to separate a plurality of ferrite cores from each other by the bonding layer. In the first and second embodiments, the above bonding step is not required, and thus, the number of fabrication steps is reduced. Further, according to the first embodiment, a multiplicity of magnetic cores (namely, the second magnetic head cores) which are to bonded to the first magnetic head cores, can be formed at the same time, and thus the number of fabrication steps required for forming thin-film multi-element magnetic heads can be greatly reduced.

As has been explained in the foregoing, the present invention can reduce the number of fabrication steps required for forming the first magnetic head core, and moreover can form a multiplicity of first magnetic head cores at the same time.

We claim:

1. A method of fabricating a multi-element magnetic head core necessary for forming a multi-element magnetic head having a plurality of magnetic circuits which are isolated from each other by a non-magnetic material, comprising the steps of:

preparing a block made of a magnetic material;

forming a plurality of first grooves parallel to each other in a surface of said block to form head portions of the magnetic circuits, a predetermined track width of the multi-element magnetic head being delimited by adjacent ones of said first grooves;

forming a plurality of second grooves in said surface of said block in directions orthogonal to said first grooves to define the length of said magnetic circuits in a recording-medium travel direction;

filling said first grooves and said second grooves with a non-magnetic material;

cutting said block along lines, each of which exists between adjacent second grooves and is substantially parallel to the second grooves, to obtain a plurality of core blocks of the multi-element magnetic head having the same shape; and forming a third groove in each core block from that surface thereof which is perpendicular to the surface having the first grooves and the second groove therein and which surface is parallel and proximate to the second groove, so that the magnetic circuits whose head portions are formed by said first grooves are separated from each other by said non-magnetic material with which said first grooves and said second groove are filled.

2. A method of fabricating a multi-element magnetic head core as claimed in claim 1, wherein said non-magnetic material is glass.

3. A method of fabricating a multi-element magnetic head core as claimed in claim 2, wherein cutting planes of each core block is ground and polished so that each core block has a predetermined length in a direction parallel to the first grooves.

4. A method of fabricating a multi-element magnetic head having a plurality of magnetic circuits which are isolated from each other by a non-magnetic material, comprising the steps of:

preparing a block made of a magnetic material;

forming a plurality of first grooves parallel to each other in a surface of said block to form head portions of the magnetic circuits, a predetermined track width of the multi-element magnetic head being delimited by adjacent ones of said first grooves;

forming a plurality of second grooves in said surface of said block in directions orthogonal to said first grooves to define the length of said magnetic circuits in a recording-medium travel direction;

filling said first grooves and said second grooves with a non-magnetc material;

cutting said block along lines, each of which exists between adjacent second grooves and is substantially parallel to the second grooves to obtain a plurality of core blocks of the multi-element magnetic head having the same shape;

forming a third groove in one of said core blocks from that surface of the core block which is perpendicular to the surface having the first grooves and the second groove therein and which surface is parallel and proximate to the second groove so that end portions of the magnetic circuits whose had portions are formed by said first grooves are separated from each other by said non-magnetic material with which said first grooves and said second groove are filled, thereby forming a first magnetic head core;

forming a plurality of winding patterns on a substrate which is made of a magnetic material, through an insulating layer to form a second magnetic head core; and bonding said first magnetic head core to said second magnetic head core.

5. A multi-element magnetic head core having a plurality of magnetic circuits, wherein a plurality of first grooves adjacent ones of which delimit a predetermined track width of a multi-element magnetic head are formed parallel to each other in a surface of a block which is made of a magnetic material, and are filled with a non-magnetic material to form head portions of the magnetic circuits and to separate said head portions from each other, wherein a second groove is formed in said surface of said block in a direction perpendicular to said first grooves and is filled with said non-magnetic material to define the length of said magnetic circuits in a recording-medium running direction, and wherein a third groove is formed in said block from that surface thereof which is perpendicular to the surface having said first grooves and said second groove therein and which surface is parallel and proximate to the second groove to separate end portions of said magnetic circuits from each other by said non-magnetic material with which said first grooves and said second groove are filled.

6. A multi-element magnetic head core according to claim 5, wherein said non-magnetic material is glass.

7. A multi-element magnetic head having a plurality of magnetic-conversion parts, comprising:

a first magnetic head core having a structure that a plurality of first grooves adjacent ones of which delimit a predetermined track width of the multi-element magnetic head are formed parallel to each other in a surface of a block which is made of a magnetic material, and are filled with a non-magnetic material to form head portions of a plurality of magnetic circuits and to separate said head portions from each other, a second groove is formed in said surface of said block in a direction perpendicular to said first grooves and is filled with said non-magnetic material to define the length of said magnetic circuits in a recording-medium running direction, and a third groove is formed in said block from that surface thereof which is perpendicular to the surface having said first grooves and said second groove therein and which surface is parallel and proximate to the second groove to separate end portions of said magnetic circuits from each other by said non-magnetic material with which said first grooves and said second groove are filled; and a second magnetic head core bonded to said first magnetic head core and having a structure that a plurality of winding patterns are formed on a substrate which is made of a magnetic material, through an insulating layer.

* * * * *